United States Patent
Liyanaarachchi et al.

(10) Patent No.: US 12,423,846 B2
(45) Date of Patent: Sep. 23, 2025

(54) REFERENCE SURFACE DETECTION FOR MOBILE DIMENSIONING

(71) Applicant: ZEBRA TECHNOLOGIES CORPORATION, Lincolnshire, IL (US)

(72) Inventors: Vipula Liyanaarachchi, Battaramulla (LK); Raveen T. Thrimawithana, Pannipitiya (LK); Michael Wijayantha Medagama, Nawala (LK)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/861,781

(22) Filed: Apr. 29, 2020

(65) Prior Publication Data
US 2021/0343035 A1    Nov. 4, 2021

(51) Int. Cl.
*G06T 7/60* (2017.01)
*G06T 7/593* (2017.01)
*G06T 19/20* (2011.01)
*H04N 13/296* (2018.01)

(52) U.S. Cl.
CPC .......... *G06T 7/593* (2017.01); *G06T 7/60* (2013.01); *G06T 19/20* (2013.01); *H04N 13/296* (2018.05); *G06T 2207/10012* (2013.01); *G06T 2219/012* (2013.01)

(58) Field of Classification Search
None
See application file for complete search history.

(56) References Cited

U.S. PATENT DOCUMENTS

| | | | |
|---|---|---|---|
| 2010/0302378 A1* | 12/2010 | Marks | G06F 3/0346 348/169 |
| 2014/0139637 A1* | 5/2014 | Mistry | G06F 1/163 348/46 |
| 2014/0210950 A1* | 7/2014 | Atanassov | G06T 7/12 348/47 |
| 2014/0355820 A1* | 12/2014 | Wu | G06T 7/75 382/103 |
| 2017/0228602 A1* | 8/2017 | Stefanovic | G01B 11/0608 |
| 2018/0286119 A1* | 10/2018 | Felip Leon | G01L 5/009 |
| 2019/0026878 A1 | 1/2019 | Jovanovski et al. | |
| 2019/0041190 A1 | 2/2019 | Okamura | |
| 2019/0139310 A1* | 5/2019 | Holzer | G06K 9/00671 |
| 2019/0295286 A1* | 9/2019 | Ishida | A63F 13/23 |
| 2021/0056720 A1* | 2/2021 | Uchida | G01B 11/002 |

OTHER PUBLICATIONS

International Search Report and Written Opinion for International Application No. PCT/US2021/29801 mailed on May 27, 2021.
Indian Examination Report for Indian patent application No. 202217059136 mailed on Sep. 18, 2024.

* cited by examiner

*Primary Examiner* — Samuel D Fereja

(57) ABSTRACT

A method includes: obtaining a reference stereo image from a stereo camera assembly of a mobile computing device; detecting a reference surface from the reference stereo image; determining an inclination angle of the reference surface relative to an output vector of an auxiliary sensor of the mobile computing device; obtaining a first dimensioning stereo image from the stereo camera assembly; detecting the reference surface in the first dimensioning stereo image based on the inclination angle; detecting a first object surface in the first dimensioning stereo image; and generating dimensions of the object based on the first object surface and the reference surface.

18 Claims, 9 Drawing Sheets

REFERENCE SURFACE DETECTION FOR MOBILE DIMENSIONING

BACKGROUND

Stereo imaging may be employed to dimension objects such as packages. For example, surfaces of the object to be dimensioned may be detected from a stereo image, and dimensions of such surfaces may then be determined. However, the accuracy of surface detection from stereo images may be negatively affected under certain conditions, reducing the accuracy of the resulting dimensions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
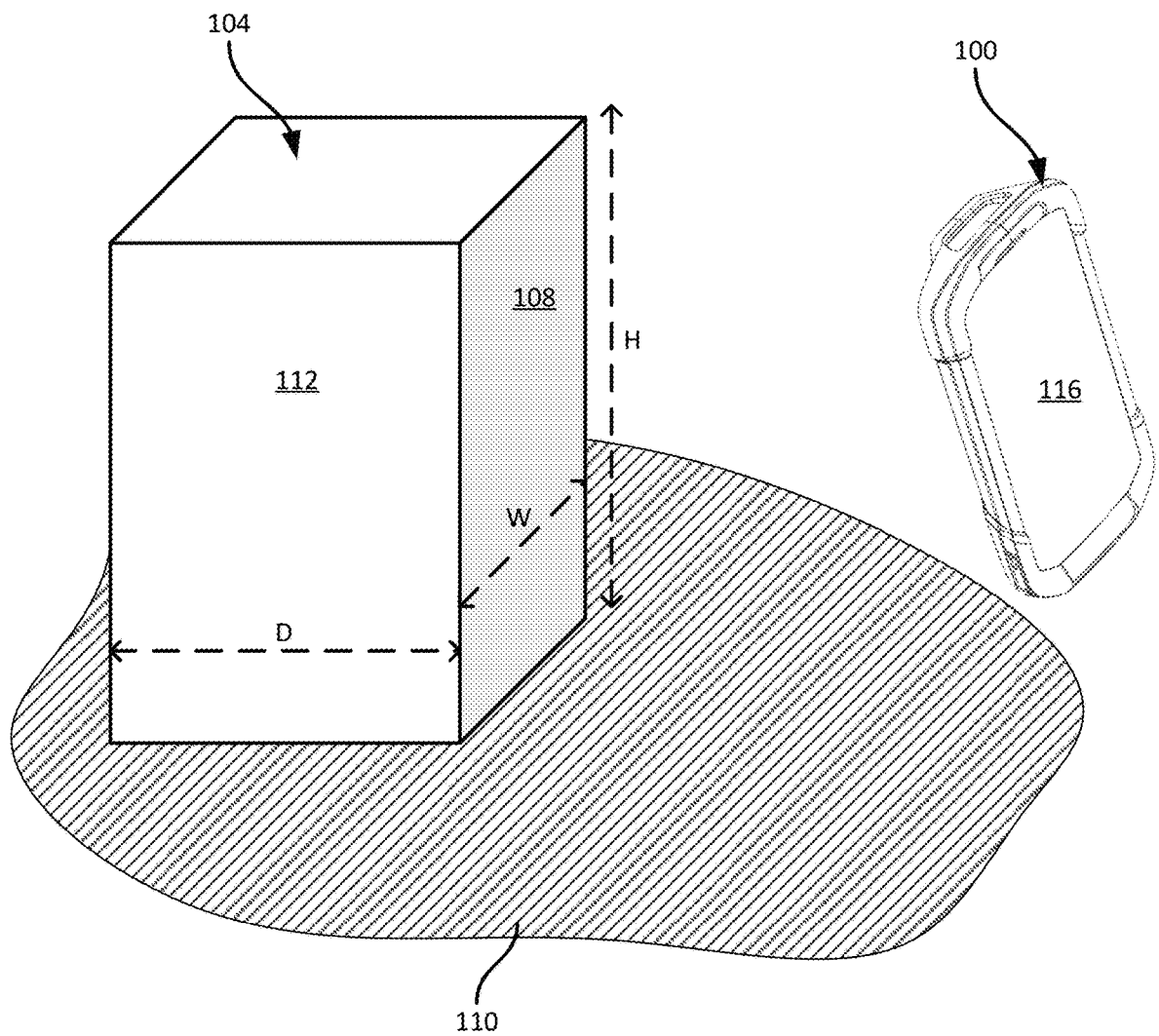
FIG. 1 is a diagram illustrating a mobile computing device to dimension an object.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method including: obtaining a reference stereo image from a stereo camera assembly of a mobile computing device; detecting a reference surface from the reference stereo image; determining an inclination angle of the reference surface relative to an output vector of an auxiliary sensor of the mobile computing device; obtaining a first dimensioning stereo image from the stereo camera assembly; detecting the reference surface in the first dimensioning stereo image based on the inclination angle; detecting a first object surface in the first dimensioning stereo image; and generating dimensions of the object based on the first object surface and the reference surface.

Additional examples disclosed herein are directed to a computing device, comprising: a stereo camera assembly; an auxiliary sensor; and a controller connected with the stereo camera assembly and the auxiliary sensor, the controller configured to: control the stereo camera assembly to capture a reference stereo image; detect a reference surface from the reference stereo image; determine an inclination angle of the reference surface relative to an output vector of the auxiliary sensor; control the stereo camera assembly to capture a first dimensioning stereo image; detect the reference surface in the first dimensioning stereo image based on the inclination angle; detect a first object surface in the first dimensioning stereo image; and generate dimensions of the object based on the first object surface and the reference surface.

Further examples disclosed herein are directed to a non-transitory computer-readable medium storing instructions executable by a processor of a mobile computing device to: control a stereo camera assembly to capture a reference stereo image; detect a reference surface from the reference stereo image; determine an inclination angle of the reference surface relative to an output vector of an auxiliary sensor; control the stereo camera assembly to capture a first dimensioning stereo image; detect the reference surface in the first dimensioning stereo image based on the inclination angle; detect a first object surface in the first dimensioning stereo image; and generate dimensions of the object based on the first object surface and the reference surface.

FIG. 1 illustrates a mobile computing device 100 (also referred to herein as the mobile device 100 or simply the device 100) that is enabled to capture stereo images and determine dimensions of objects represented in the images. For example, the device 100 can be operated to capture a first stereo image of an object 104, e.g. showing a first side 108 of the object 104. The object 104 can be a package or collection of packages (e.g. on a pallet) in a transport and logistics facility, for example. From the first stereo image, the device 100 can detect the side 108, as well as a reference surface. The reference surface is a surface which the object 104 rests, such as a floor 110, a ramp, a shelf, or another support surface detected by the device 100. The device 100 can then be configured to determine dimensions of the object 104 from the side 108, such as a height "H" and a width "W".

The device 100 can also be configured to capture a second stereo image, e.g. after repositioning of the device 100 to face another side 112 of the object 104. From the second stereo image the device 100 can detect the side 112 and the floor 110, and determine dimensions such as the height H (e.g. for verification against the height determined from the side 108) and a depth "D" of the object 104. The dimensions generated by the device 100 can be employed to generate a bounding box encompassing the object 104, for use by other computing devices associated with the device 100 (e.g. to optimize the use of space in a container used to ship the object 104, to determine a shipping cost for the object 104, and the like).

Although the sides 108 and 112 of the object 104 are illustrated in the present example as planar surfaces, in other examples the object 104 can include a combination of planar and non-planar (e.g. curved) surfaces.

As noted above, generation of dimensions of the object 104 by the device 100 depends in part on accurate detection of the floor 110 or other suitable reference surface. The reference surface may, for example, be used to aid in detection of the sides 108 and 112, and as a reference from which the height H can be measured. Detection of the floor 110 may be negatively affected by various factors. An example of those factors includes low point cloud density. In particular, stereo images depicting both the object 104 and the floor 110, from which a point cloud is generated for use in determining dimensions, may depict a small area of the floor 110 (particularly when the object 104 is large). Detection of the floor 110 in stereo images containing few pixels corresponding to the floor 110 may result in an inaccurate detection, because numerous candidate planes may fit the available pixels corresponding to the floor.

Accuracy of floor detection may be improved by providing an input parameter to the plane detection mechanism (e.g. Random Sample Consensus or RANSAC plane fitting). An example input is a gravity vector determined by the device 100, indicating a vertical orientation. The gravity vector can be provided as an input to the plane fitting operation. The plane fitting operation, for example, can be configured to search for planes that are substantially perpendicular to the gravity vector, which may eliminate certain candidate planes that otherwise fit the stereo image, and therefore increase the likelihood of selecting an accurate plane corresponding to the floor 110.

The above approach, however, may result in inaccurate reference plane detection when the gravity vector has an offset (e.g. due to miscalibration of a motion sensor of the device 100), or when the floor 110 is not in fact perpendicular to gravity. Ramps or other slanted (i.e. non-horizontal) surfaces, for example, may be inaccurately detected using a gravity vector as an input.

The device 100 therefore implements additional functionality to detect reference surfaces such as the floor 110, as will be discussed below. The device 100 also generates dimensions as discussed above, e.g. for rendering on a display 116 of the device 100, transmission to another computing device, or the like.

Figure 2:
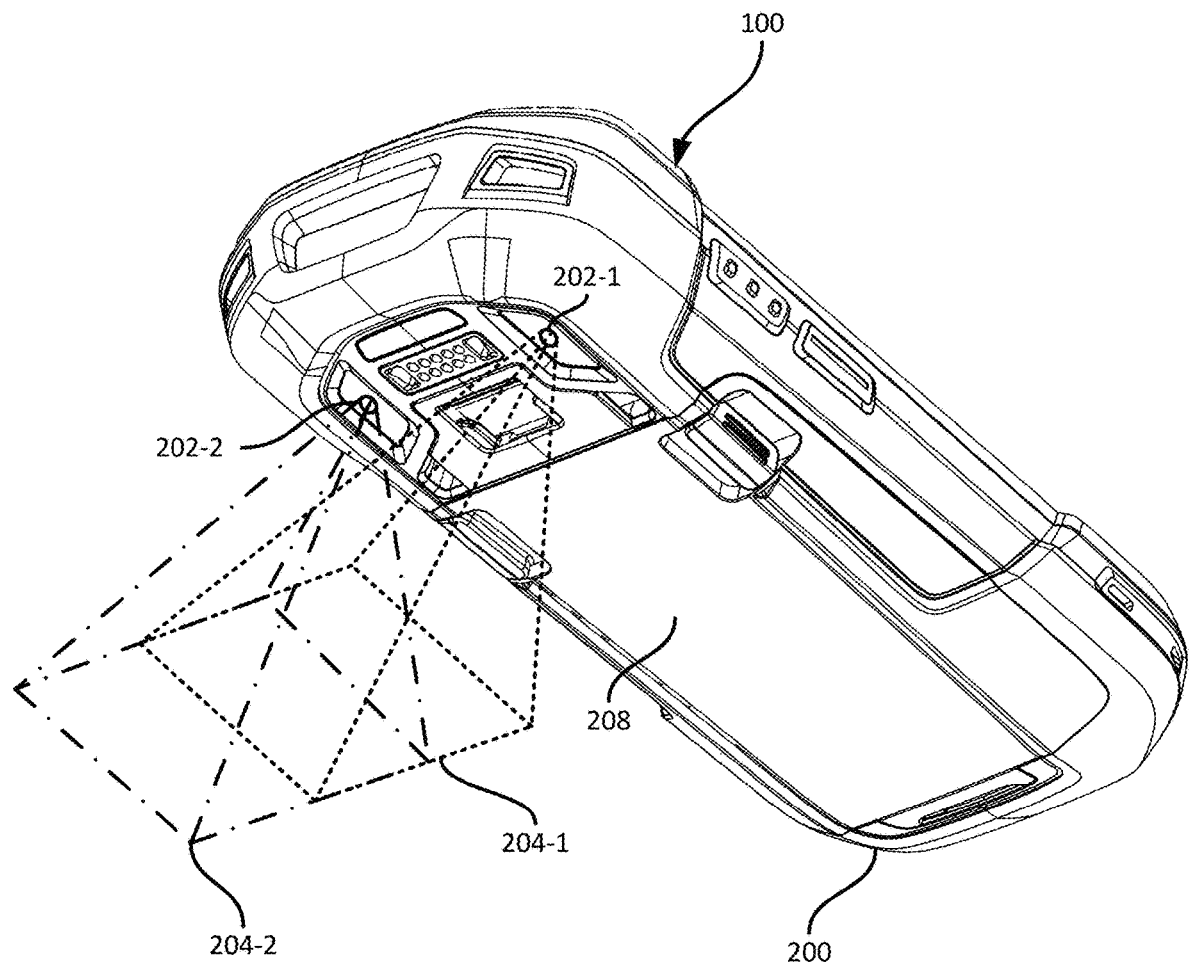
FIG. 2 is a diagram illustrating a rear view of the mobile computing device of FIG. 1.

Turning to FIG. 2, the device 100 is shown from the rear to illustrate an example stereo camera assembly, as well as certain other components of the device 100. As shown in FIG. 2, the device 100 includes a housing 200 supporting the various components of the device 100. Among the components supported by the housing 200 are the display 116 shown in FIG. 1, which may include an integrated touch screen. The device 100 can also include other input and/or output components, in addition to or instead of the display 116 and touch screen mentioned above. Examples of such components include speakers, microphones, keypads, and the like.

The device 100 also includes a stereo camera assembly having a first camera 202-1 and a second camera 202-2, spaced apart from each other on the housing 200 of the device 100. The cameras 202 each include a suitable image sensor or combination of image sensors, optical components (e.g. lenses) and the like. The cameras 202 have respective fields of view (FOV) 204-1 and 204-2 extending away from a back surface 208 of the device 100 (opposite the display 116). The FOVs 204, in the illustrated example, are substantially perpendicular to the back surface 208.

The FOVs 204 overlap, as illustrated in FIG. 2, enabling the device 100 to determine information such as dimensions for any objects that appear in both FOVs 204 (e.g. the object 104 shown in FIG. 1). The degree of overlap shown in FIG. 2 is purely for illustrative purposes. In other examples, the FOVs 204 may overlap to a greater or smaller degree than illustrated.

Before further discussing the functionality implemented by the device 100, certain components of the device 100 will be described, with reference to FIG. 3.

Figure 3:
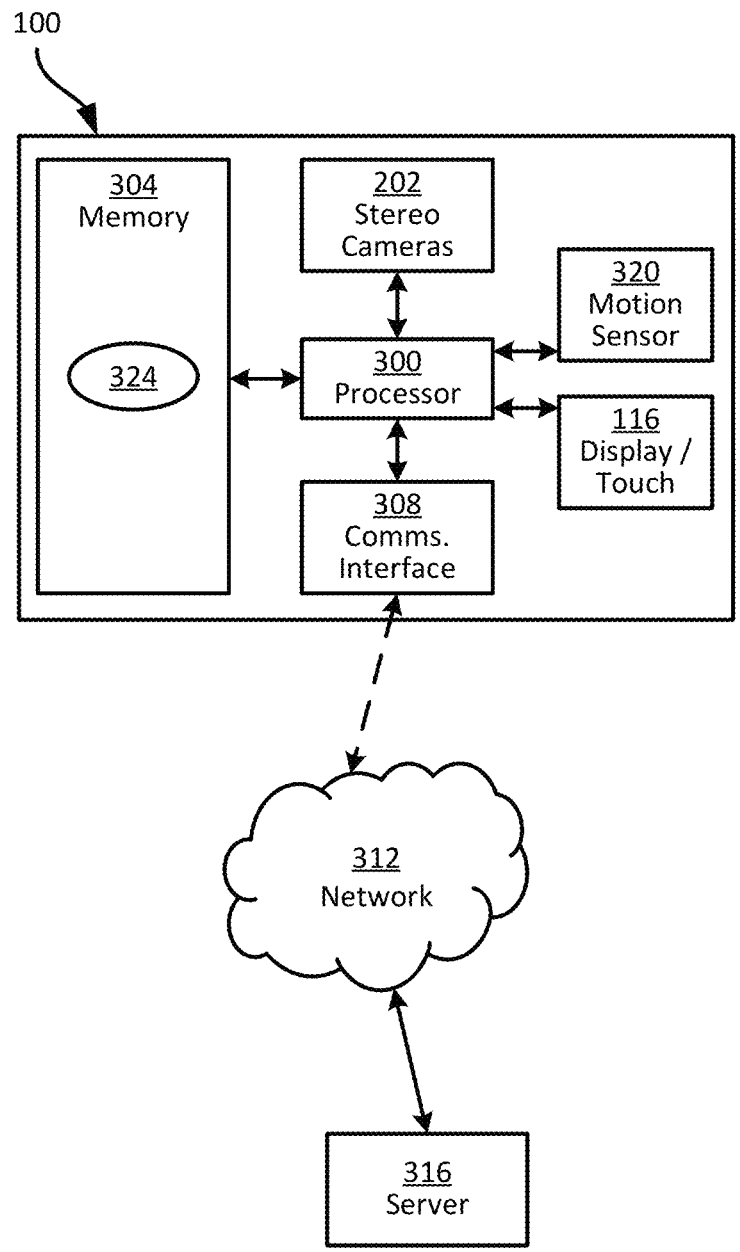
FIG. 3 is a block diagram of certain internal hardware components of the mobile computing device of FIG. 1.

Referring to FIG. 3, a block diagram of certain components of the device 100 is illustrated. In addition to the display (and integrated touch screen, in this example) 116 and cameras 202, the device 100 includes a special-purpose controller, such as a processor 300, interconnected with a non-transitory computer readable storage medium, such as a memory 304. The memory 304 includes a combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits.

The device 100 also includes a communications interface 308 enabling the device 100 to exchange data with other computing devices, e.g. via a network 312. The other computing devices can include a server 316, which may be deployed within the facility in which the device 100 is deployed. The server 316 can also be deployed remotely from the above-mentioned facility.

In addition, the device 100 includes a motion sensor 320, such as an inertial measurement unit (IMU) including a suitable combination of gyroscopes, accelerometers and the like. The motion sensor 320 is configured to provide measurements to the processor 300 defining motion and/or orientation of the device 100. In particular, as discussed below, the motion sensor can provide a gravity vector indicating at least the orientation of the device 100 relative to the vertical direction (i.e. towards the center of the planet). Alternatively, the processor 300 can generate the gravity vector from data received from the motion sensor 320.

The memory 304 stores computer readable instructions for execution by the processor 300. In particular, the memory 304 stores a dimensioning application 324 which, when executed by the processor 300, configures the processor 300 to process stereo images captured via the cameras 202 to detect a reference surface such as the floor 110, and to also detect and dimension objects such as the object 104, using an input parameter derived from the reference surface and the above-mentioned gravity vector.

The processor 300, when so configured by the execution of the application 324, may also be referred to as a dimensioning controller, or simply a controller. Those skilled in the art will appreciate that the functionality implemented by the processor 300 via the execution of the application 324 may also be implemented by one or more specially designed hardware and firmware components, such as FPGAs, ASICs and the like in other embodiments.

Figure 4:
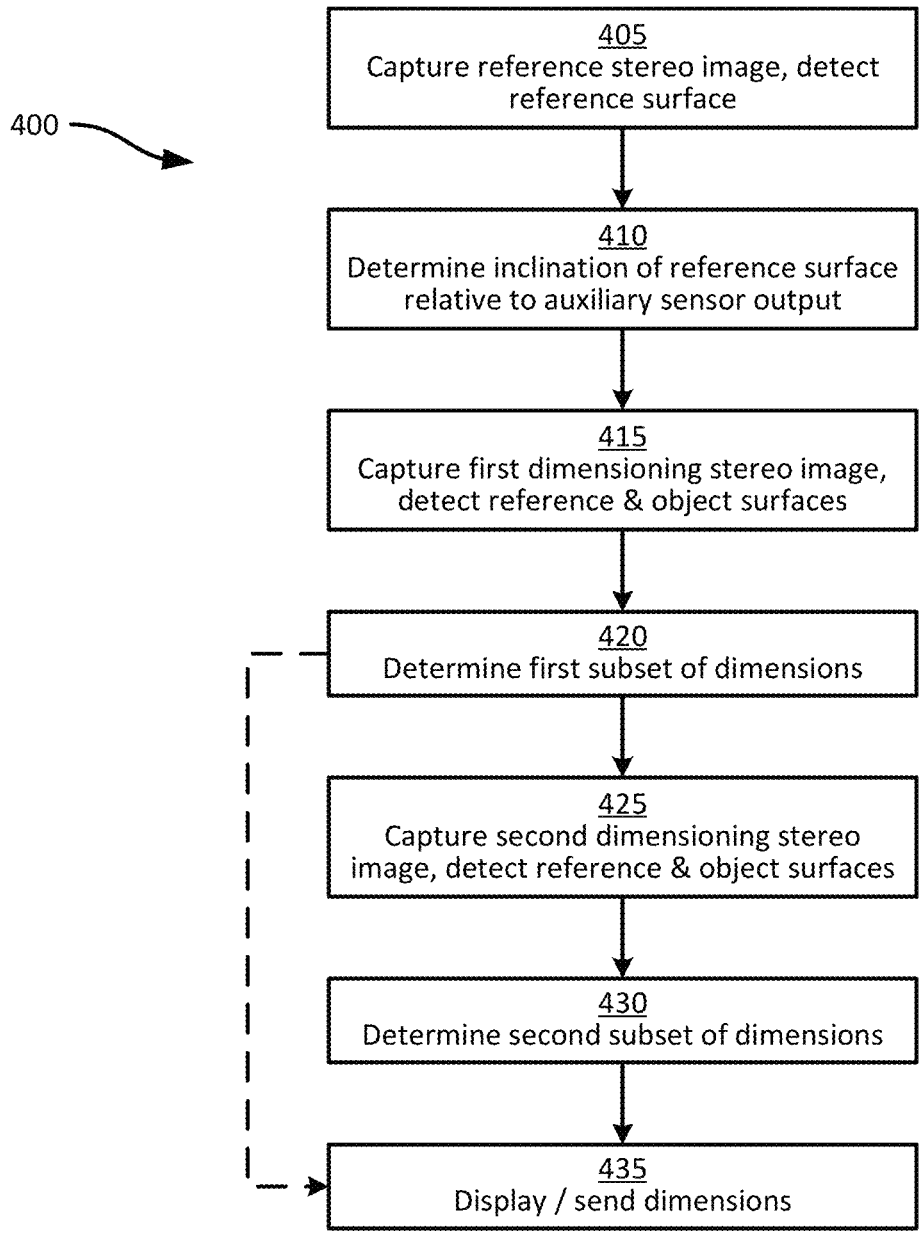
FIG. 4 is a flowchart of a method of object dimensioning.

Turning now to FIG. 4, the functionality implemented by the device 100 will be discussed in greater detail. FIG. 4 illustrates a dimensioning method 400, which will be discussed below in conjunction with its performance by the device 100.

At block 405, the device 100 is configured to capture a reference stereo image using the cameras 202. A stereo image, as referred to herein, is a pair of stereo images captured substantially simultaneously by the cameras 202-1 and 202-2 and combined to generate a point cloud or other three-dimensional representation of the scene captured by the cameras 202.

The reference stereo image can be captured at block 405 by the device 100 in response to an input, e.g. received at the touch screen integrated with the display 116. The input may be, for example, a command to begin a dimensioning process. The reference stereo image is referred to as a "reference" because the device 100 is configured to detect a reference surface such as the floor 110 from the reference image. That is, although the performance of block 405 initiates a process for dimensioning an object, the object itself is not detected in the reference image, and indeed need not be captured in the reference image.

Figure 5:
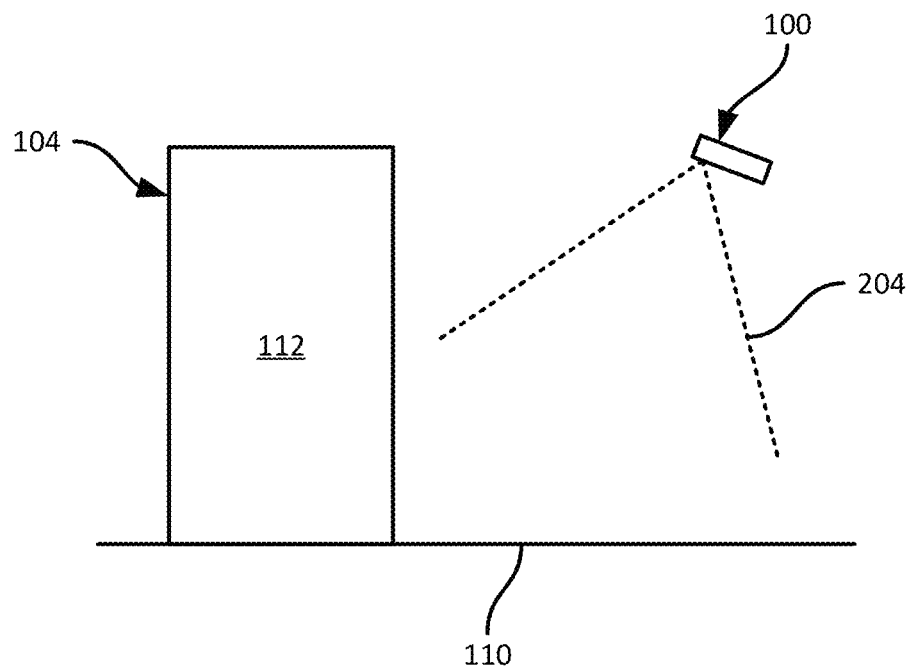
FIG. 5 is a diagram illustrating a performance of block 405 of the method of FIG. 4.
Figure 5:
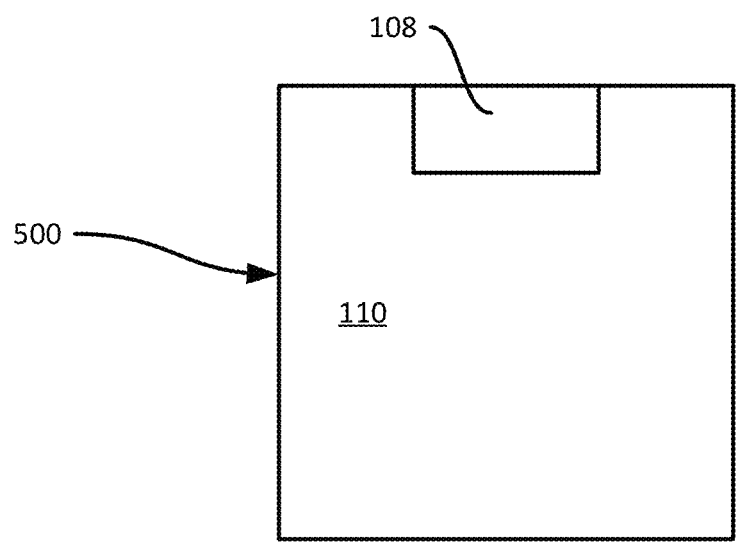

Turning to FIG. 5, an example performance of block 405 is illustrated. In particular, the device 100 is shown oriented such that the fields of view 204 of the cameras 202 capture primarily or entirely a portion of the floor 110. A reference stereo image 500 resulting from the capture operation is also shown in FIG. 5. Although the reference stereo image 500 is illustrated as a single two-dimensional frame in FIG. 5, it will be understood that the reference stereo image 500 (and all other stereo images illustrated herein) may in fact by a three-dimensional point cloud generated from a pair of frames captured by the cameras 202.

The reference stereo image 500 depicts a portion of the side 108 of the object 104, as well as the floor 110. In other examples, the reference stereo image 500 can omit the object 104 entirely. The processor 300 is configured to detect the floor 110 in the reference stereo image, for example by applying a plane fitting operation (e.g. RANSAC) to the reference stereo image 500. When other surfaces, such as a portion of the side 108 of the object 104, are present the processor 300 can be configured to ignore such surfaces when they occupy a portion of the image 500 below a threshold (e.g. 25% of the points in the point cloud).

The reference surface detected at block 405 can be defined, for example, by a point and a normal vector in a frame of reference (e.g. the frame of reference in which the point cloud is defined). The processor 300 can be configured to evaluate a quality of the detected reference surface at block 405. For example, the plane fitting operation may generate a confidence level indicating a proportion of the points in the reference image 500 that lie on the detected surface, or another suitable metric indicating the degree to which the detected surface fits the points in the image 500. When the confidence level is below a threshold, the processor 300 can control the display 116 to present a warning or error message, and/or a prompt to repeat block 405.

Returning to FIG. 4, at block 410 the processor 300 is configured to determine an angle of inclination of the reference surface detected at block 405 relative to an auxiliary sensor output vector. In the present example, the auxiliary sensor is the motion sensor 320 mentioned in connection with FIG. 3, and the auxiliary sensor output is the above-mentioned gravity vector. The processor 300, at block 410, is configured to determine an angle between the normal vector defining the reference surface and the gravity vector generated by the motion sensor 320 or based on the output of the motion sensor 320.

Figure 6:
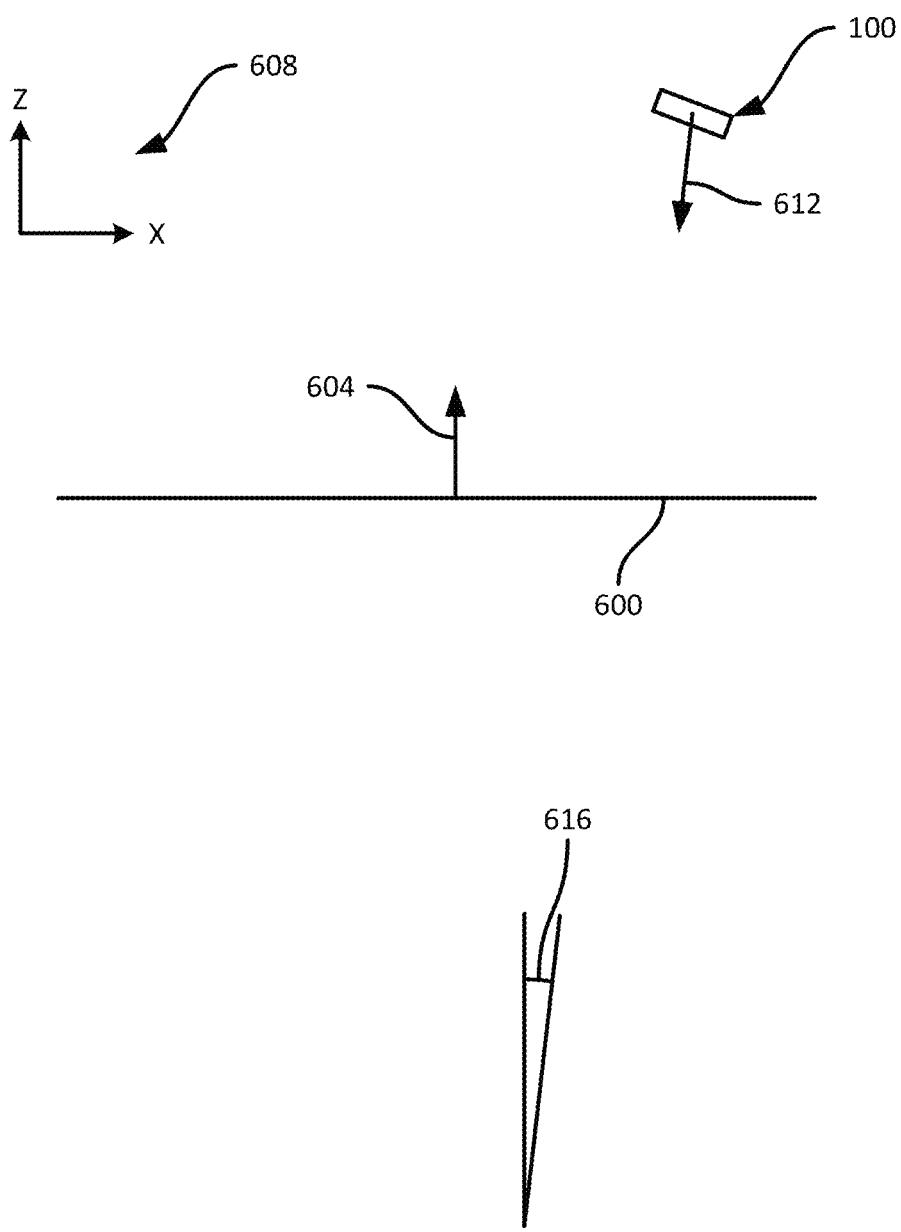
FIG. 6 is a diagram illustrating a performance of block 410 of the method of FIG. 4.

Referring to FIG. 6, a side view of the device 100 and a detected reference surface 600 corresponding to the floor 110 are shown. A normal vector 604 corresponding to the reference surface 600 is also illustrated. The normal vector 604, and/or other suitable parameters defining the reference surface 600, are defined according to a frame of reference 608. Also shown in FIG. 6 is a gravity vector 612 generated by the motion sensor 320, or by the processor 300 based on data from the motion sensor 320. As seen in FIG. 6, the gravity vector 612 is not entirely vertical, for example due to miscalibration of the motion sensor 320 or other measurement error.

The processor 300 is configured to determine an angle 616 between the gravity vector 612 and the normal vector 604 of the reference surface 600. The angle 616 may be defined as, for example, a set of angles (e.g. in each of the XZ, XZ and YZ planes of the frame of reference 608).

Figure 7:
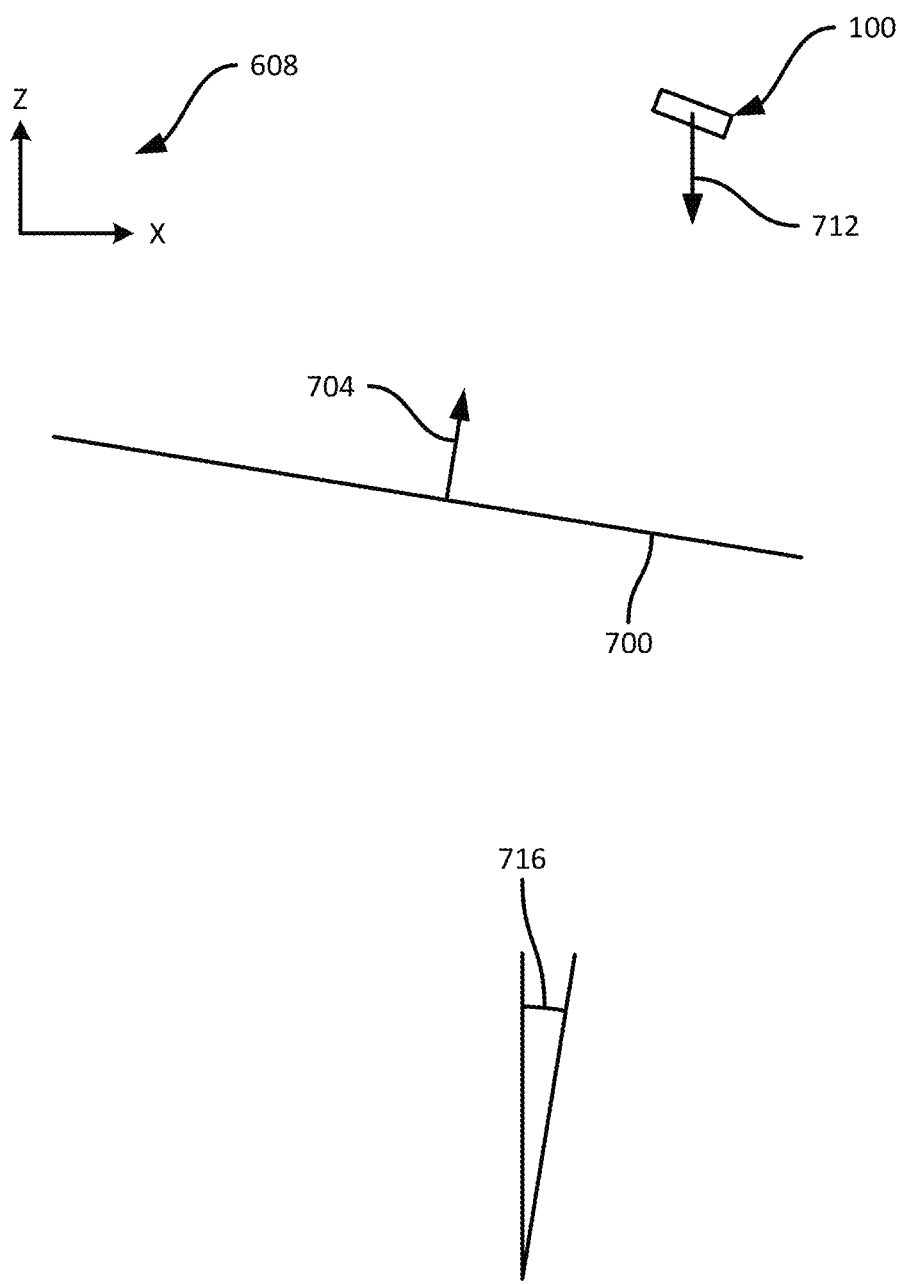
FIG. 7 is a diagram illustrating another performance of block 410 of the method of FIG. 4.

FIG. 7 illustrates another example performance of block 410. In particular, a reference surface 700 is shown according to the frame of reference 608, with a normal vector 704. In addition, a gravity vector 712 is shown as having been generated by the motion sensor 320. While the gravity vector 712 is vertical, the floor represented by the reference surface 700 is non-horizontal. In the example of FIG. 7, the processor 300 is configured to generate an angle 716 between the normal vector 704 and the gravity vector 712 for subsequent use in dimensioning.

Both FIGS. 6 and 7 illustrate conditions under which the reference surface is not perpendicular to the gravity vector. Under such conditions, using the gravity vector alone as an input to the plane fitting operation in subsequent dimensioning functionality may lead to inaccurate reference surface detection and therefore inaccurate dimensioning.

Returning to FIG. 4, at block 415 the processor 300 is configured to capture a first dimensioning stereo image via the cameras 202. The dimensioning stereo image is distinguished from the reference stereo image discussed above by its use in detecting and dimensioning the object 104, as discussed below. Therefore, the processor 300 can be configured, following the performance of block 410, to generate a prompt on the display 116 to direct the operator of the device 100 to re-orient the device 100 to place the object 104 within the FOVs 204 of the cameras 202. When the device 100 is oriented to capture the object 104, the processor can capture the first dimensioning stereo image in response to activation of an input on the touch screen or another suitable input of the device 100.

Having captured the first dimensioning stereo image, the processor 300 is configured to detect the reference surface mentioned above, as well as at least one surface of the object 104. As will be apparent to those skilled in the art, the reference surface occupies a smaller portion of the dimensioning image than of the reference image 500 shown in FIG. 5. To assist in accurately detecting the reference surface, the processor 300 employs the angle of inclination determined at block 410.

Figure 8:
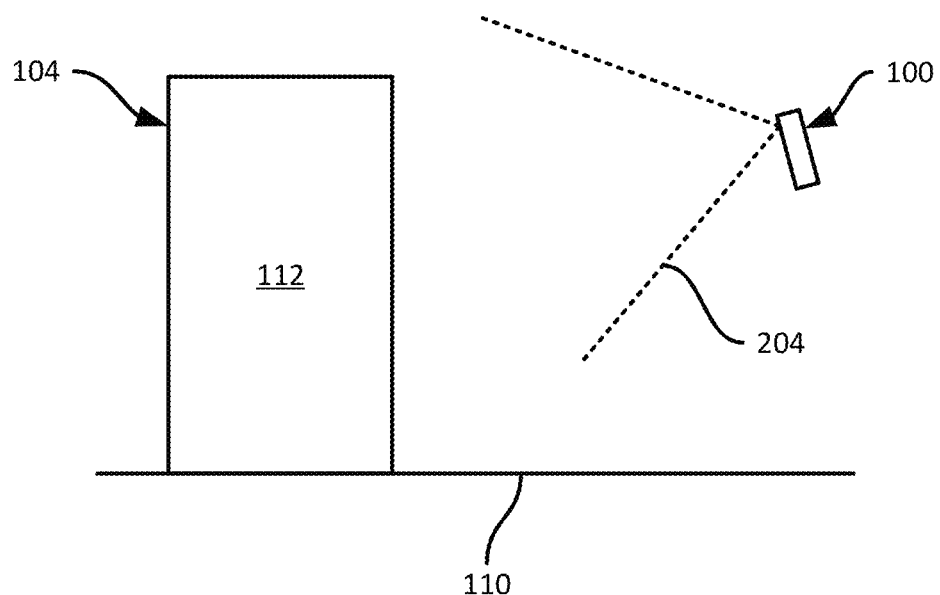
FIGS. 8 and 9 are diagrams illustrating a performance of block 415 of the method of FIG. 4.
Figure 8:
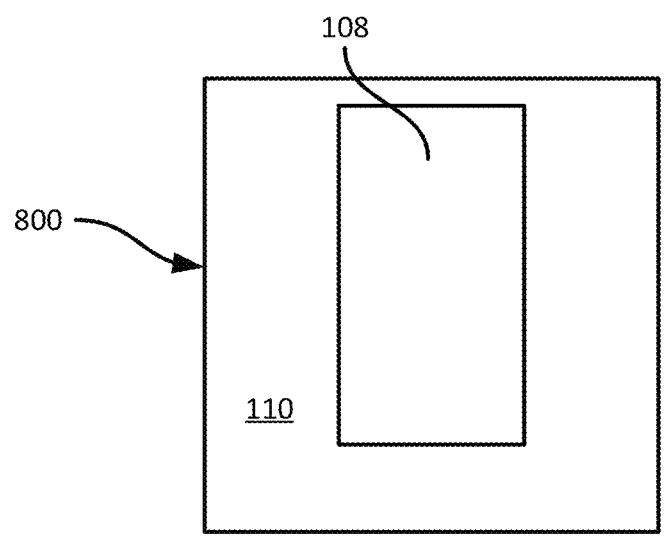

Referring to FIG. 8, the device 100 is shown having been repositioned such that the FOVs 204 fully encompass the object 104. In response to activation of an input, the processor 300 captures the first dimensioning stereo image via the cameras 202. A first dimensioning stereo image 800 is shown in FIG. 8, depicting the entire side 108 of the object 104 as well as a portion of the floor 110. As will be apparent by comparing the image 800 with the image 500, the image 800 depicts a smaller portion of the floor 110 than the image 500, and accuracy of detection of the floor 110 from the image 800 may therefore be reduced in comparison with detection of the floor 110 from the image 500.

Also at block 415, the processor 300 is configured to detect the reference surface detected at block 405. That is, in the present example the processor 300 is configured to detect the floor 110 from the image 800, e.g. based on a suitable plane fitting operation. In contrast to the reference surface detection at block 405, however, the processor 300 is configured to apply a constraint to the plane fitting operation.

Specifically, the constraint is based on the angle of inclination from block 410. The angle of inclination, as noted above, is measured between the gravity vector (e.g. 612 or 712) and the normal vector 604 or 704 of the reference surface as detected at block 405. The processor 300 is therefore configured, at block 415, to obtain a current gravity vector from the motion sensor 320 (i.e. generated substantially simultaneously with capture of the first dimensioning stereo image). The processor 300 is further configured to generate the above-mentioned constraint by combining the gravity vector and the angle of inclination from block 410.

Figure 9:
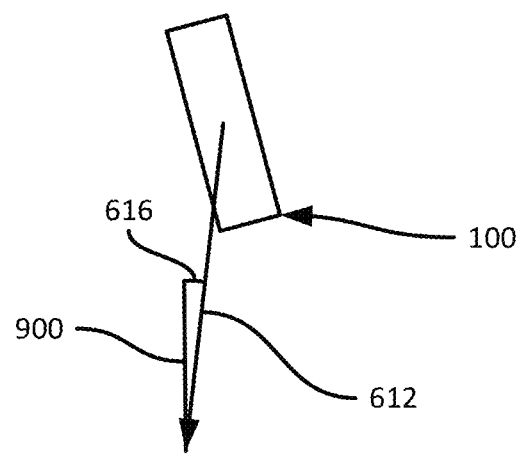
Figure 9:
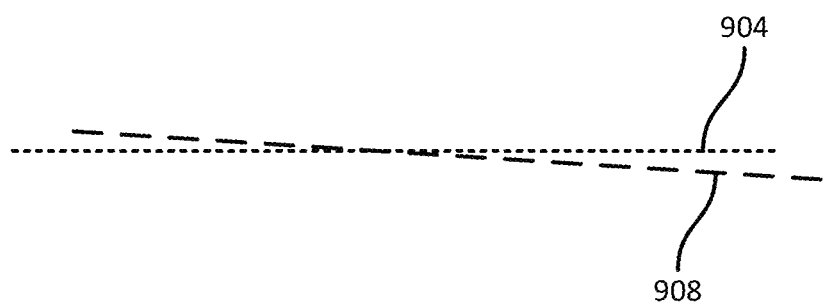

Turning to FIG. 9, the gravity vector 612 is shown, along with the angle of inclination 616 generated at block 410. As seen in FIG. 9, the combination of the gravity vector 612 and the angle of inclination 616 produces a constraint vector 900. The constraint vector 900 is provided as an input to the plane fitting operation at block 415. Specifically, the processor 300 is configured to search for a reference surface perpendicular to the constraint vector 900 (rather than to the gravity vector 612).

FIG. 9 also illustrates two candidate reference surfaces 904 and 908 derived from the image 800. For example, each of the reference surfaces 904 and 908 may fit the points in the image 800 depicting the floor 110 equally well. However, the use of the constraint vector 900 enables the processor 300 to select the candidate reference surface 904 as corresponding to the floor 110, rather than the candidate surface 908 (which may have been selected if the gravity vector 612 alone were employed as an input to the plane fitting operation).

Referring again to FIG. 4, the processor 300 is also configured to detect at least one surface of the object 104. In the present example, as illustrated in FIG. 8, the device 100 is oriented such that the side 108 of the object 104 faces the device 100, and the processor 300 therefore detects the side 108 at block 415 (but not the side 112, which is not visible in the image 800).

At block 420, having detected the reference surface and object surface(s), the processor 300 is configured to determine a first subset of dimensions for the object 104. In the present example, having identified the side 108 from the image 800, the processor 300 is configured to determine the height H and the width W of the object 104 based on the side 108 and the reference surface 904 (corresponding to the floor 110).

In some examples, the performance of the method 400 can terminate following the performance of block 420. In the present example, however, the processor 300 is configured to proceed to block 425 and capture a second dimensioning stereo image. For example, when the reference surface and object surface(s) are successfully detected at block 415 and dimensioned at block 420, the processor 300 can generate a prompt for the operator of the device 100 to reposition the device 100 to face the side 112 of the object 104 and capture an additional frame.

At block 425, the processor 300 controls the cameras 202 to capture a second dimensioning stereo image depicting the object 104 (e.g. the side 112) and a portion of the floor. The processor 300 is configured to detect the floor 110 as a reference surface using the same methodology as described in connection with block 425, and to also detect the side 112 of the object 104. At block 430, the processor 300 is configured to determine a second subset of dimensions of the object 104, such as the height H and the depth D.

At block 435, following the performance of block 430 or of block 420 (as indicated by the dashed line in FIG. 4), the processor 300 is configured to present the dimensions determined at block 420 and/or block 430. Presenting the dimensions can include rendering the dimensions on the display 116, transmitting the dimensions to another computing device (e.g. the server 316), or the like.

Variations to the above functionality are contemplated. For example, rather than capturing the reference stereo image at the beginning of the dimensioning process as shown in FIG. 4, the reference stereo image can be captured after capturing the second dimensioning stereo image. In such embodiments, the point clouds generated from the first and second dimensioning stereo images captured at block 415 and 425 are stored but not dimensioned. Instead, reference surfaces are detected in the first and second dimensioning stereo images, and dimensions are then determined therefrom, after the reference stereo image is captured and the angle of inclination is determined.

Although the processing involved in dimensioning the object 104 as described above is performed at the device 100, in other examples the processing can be performed at another computing device, such as the server 316. For example, the device 100 can capture the reference and dimensioning stereo images and transmit the images to the server 316, and the server 316 can detect reference and object surfaces as well as the angle of inclination and dimensions. As will be apparent, in such implementations the device 100 also sends the gravity vector 612 or 712 to the server 316 with the captured stereo images.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
obtaining a reference stereo image from a stereo camera assembly of a mobile computing device;
detecting a reference object support surface from the reference stereo image;
determining, based on the reference object support surface detected from the reference stereo image and an output gravity vector from a motion sensor of the mobile computing device, an inclination angle of the reference object support surface corresponding to an angle between the output gravity vector from the motion sensor of the mobile computing device and a normal vector to the reference object support surface;
obtaining a first dimensioning stereo image from the stereo camera assembly;
detecting the reference object support surface in the first dimensioning stereo image, using the inclination angle as a constraint;
detecting a first object surface in the first dimensioning stereo image; and
generating dimensions of the object based on the first object surface and the reference object support surface.

2. The method of claim 1, further comprising:
obtaining a second dimensioning stereo image from the stereo camera assembly;
detecting the reference object support surface in the second dimensioning stereo image based on the inclination angle;
detecting a second object surface in the second dimensioning stereo image; and
generating further dimensions of the object based on the second object surface and the reference object support surface.

3. The method of claim 2, comprising obtaining the reference stereo image prior to obtaining the first dimensioning stereo image.

4. The method of claim 2, comprising obtaining the reference stereo image after obtaining the second dimensioning stereo image.

5. The method of claim 2, wherein the dimensions include a height and a width, and wherein the further dimensions include a depth.

6. The method of claim 1, wherein using the inclination angle as a constraint includes providing the inclination angle as an input to a plane fitting operation.

7. The method of claim 1, further comprising: rendering the dimensions on a display of the mobile computing device.

8. The method of claim 1, wherein the reference object support surface includes at least one of a floor, a ramp, or a shelf.

9. A computing device, comprising:
a stereo camera assembly;
a motion sensor; and
a controller connected with the stereo camera assembly and the motion sensor, the controller configured to:
control the stereo camera assembly to capture a reference stereo image;
detect a reference object support surface from the reference stereo image;
determine, based on the reference object support surface detected from the reference stereo image and an output gravity vector from the motion sensor, an inclination angle of the reference object support surface corresponding to an angle between the output gravity vector from the motion sensor and a normal vector to the reference object support surface;
control the stereo camera assembly to capture a first dimensioning stereo image;
detect the reference object support surface in the first dimensioning stereo image, using the inclination angle as a constraint;
detect a first object surface in the first dimensioning stereo image; and
generate dimensions of the object based on the first object surface and the reference object support surface.

10. The computing device of claim 9, wherein the controller is further configured to:
control the stereo camera assembly to capture a second dimensioning stereo image from the stereo camera assembly;

detect the reference object support surface in the second dimensioning stereo image based on the inclination angle;

detect a second object surface in the second dimensioning stereo image; and generate further dimensions of the object based on the second object surface and the reference object support surface.

11. The computing device of claim 10, wherein the controller is further configured to capture the reference stereo image prior to capturing the first dimensioning stereo image.

12. The computing device of claim 10, wherein the controller is further configured to capture the reference stereo image after capture of the second dimensioning stereo image.

13. The computing device of claim 10, wherein the dimensions include a height and a width, and wherein the further dimensions include a depth.

14. The computing device of claim 9, wherein the controller is configured, in order to use the inclination angle as a constraint, to provide the inclination angle as an input to a plane fitting operation.

15. The computing device of claim 9, further comprising a display, wherein the controller is further configured to render the dimensions on the display.

16. The computing device of claim 9, wherein the reference object support surface includes at least one of a floor, a ramp, or a shelf.

17. A non-transitory computer-readable medium storing instructions executable by a processor of a mobile computing device, the instructions comprising:

controlling a stereo camera assembly to capture a reference stereo image;

detecting a reference object support surface from the reference stereo image;

determining, based on the reference object support surface detected from the reference stereo image and an output gravity vector from a motion sensor of the mobile computing device, an inclination angle of the reference object support surface corresponding to an angle between the output gravity vector from the motion sensor of the mobile computing device and a normal vector to the reference object support surface;

controlling the stereo camera assembly to capture a first dimensioning stereo image;

detecting the reference object support surface in the first dimensioning stereo image, using the inclination angle as a constraint;

detecting a first object surface in the first dimensioning stereo image; and generating dimensions of the object based on the first object surface and the reference object support surface.

18. The non-transitory computer-readable medium of claim 17, the instructions further comprising:

controlling the stereo camera assembly to capture a second dimensioning stereo image from the stereo camera assembly;

detecting the reference object support surface in the second dimensioning stereo image based on the inclination angle;

detecting a second object surface in the second dimensioning stereo image; and generating further dimensions of the object based on the second object surface and the reference surface.

* * * * *